July 10, 1956   F. C. BIGGERT, JR   2,753,689
HYDRAULIC CONTROL CIRCUIT
Filed Feb. 16, 1953   5 Sheets-Sheet 1

INVENTOR.
FLORENCE C. BIGGERT, JR.
(DECEASED)
FIDELITY TRUST COMPANY
(EXECUTOR)
BY Joseph E. Dickman
ATTORNEY INVENTOR.
FLORENCE C. BIGGERT, JR.
(DECEASED)
FIDELITY TRUST COMPANY
(EXECUTOR)
BY
ATTORNEY INVENTOR.
FLORENCE C. BIGGERT, JR.
(DECEASED)
FIDELITY TRUST COMPANY
(EXECUTOR)
BY Joseph E. Duhmun
ATTORNEY July 10, 1956   F. C. BIGGERT, JR   2,753,689
HYDRAULIC CONTROL CIRCUIT
Filed Feb. 16, 1953   5 Sheets-Sheet 4

INVENTOR.
FLORENCE C. BIGGERT, JR.
(DECEASED)
FIDELITY TRUST COMPANY
(EXECUTOR)
BY Joseph E. Dickman
ATTORNEY July 10, 1956  F. C. BIGGERT, JR  2,753,689
HYDRAULIC CONTROL CIRCUIT
Filed Feb. 16, 1953  5 Sheets-Sheet 5

INVENTOR.
FLORENCE C. BIGGERT, JR.
(DECEASED)
FIDELITY TRUST COMPANY
(EXECUTOR)
BY
ATTORNEY

United States Patent Office 2,753,689
Patented July 10, 1956

2,753,689
HYDRAULIC CONTROL CIRCUIT

Florence C. Biggert, Jr., deceased, late of Pittsburgh, Pa., by Fidelity Trust Co., executor, assignor to United Engineering and Foundry Company, Pittsburgh, Pa., a corporation of Pennsylvania Application February 16, 1953, Serial No. 337,176

11 Claims. (Cl. 60—97)

This invention relates to hydraulic controls for heavy duty presses and, in particular, to controls operable by fluid pressure means having in combination therewith means for compensating for any misalignment of the moving platen which may take place during the working stroke thereof, such misalignment usually resulting from extremely heavy eccentric loads encountered in die forging operations.

Particularly in those instances in which high capacity heavy duty hydraulic presses are required for withstanding extremely high eccentric loads, as may be encountered in die pressing or forging operations, the problems incident to resisting the lateral forces thus set up in the guides and housing posts become quite serious. In some instances guides alone are relied upon for resisting the forces due to canting the misalignment of the platens. In such cases wear takes place quite rapidly, requiring frequent replacement of the guides and bearing surfaces. In other instances dual pumps have been proposed for compensating for the forces causing misalignment of the movable platen, the pumps being so arranged as to deliver controlled quantities of fluid at varying pressures to the press working cylinders so as to speed up the lagging portions of the platen in order to maintain some semblance of parallelism between the platens. The employment of pumps, however, is not satisfactory since constant attention and individual control of each pump is required. Further arrangements have been proposed in which double acting main press piston-cylinder assemblies having equal areas are provided, having cross connections between the upper chambers thereof and the lower chambers of those diametrically oppositely disposed. Such a system, however, fails to take into account the effect of leakage, expansion of certain connections caused by the high pressures encountered in presses of the capacity of those for which the invention disclosed herein is adapted to be employed and compression of the fluid employed.

It is significant that even though water is used, which is the cheapest as well as the best fluid to employ for press operation by reason of its low coefficient of compressibility, the losses in volume incident to compression alone by reason of the large volumes and heavy loadings encountered can be quite serious. For each pound per square inch of pressure applied at ordinary temperatures, the volume of water is decreased by from .0000034 part; hence, in a particular press in which, for example, 60,000 cubic inces of water is placed under a pressure of 8000 pounds per square inch, there would be caused a reduction in volume of at least 1200 cubic inches assuming the balancing cylinders to have an effective area of 500 square inches. Consequently, it would be possible for one piston to move relatively to the other a distance of 2.4 inches and the platen will be out of alignment by that amount. Of course, misalignment of a platen by such a magnitude is out of the question as it would result in an impractical condition.

As will be more specifically described hereinafter, this invention provides a combination of elements for use with an hydraulic press having a plurality of single acting piston-cylinder assemblies for actuating the movable platen during the working stroke thereof, including a plurality of double acting balancing and pull back piston cylinder assemblies, first for maintaining the movable platen level during the working stroke and, second for returning the platen to its pull-back or idle position. At such times as the movable platen, during its working stroke, tends to become misaligned particularly on encountering heavy eccentric loadings, compensating forces are set up by means of the arrangement disclosed to effect a righting couple to overcome the misaligning forces by providing fluid interconnections between the balancing cylinders for permitting the fluid to flow from the bottom chambers of the balancing cylinders on the low side of the moving platen to the top chambers of the cylinders diametrically opposed, and such action is supplemented by controllably introducing make-up fluid to the cylinders to compensate not only for losses caused by leakage but also for loss in volume due to compression of the fluid and expansion of the various fluid conduits and cylinder chambers of the press.

One of the objects of this invention is to provide hydraulic controls for an hydraulic press for maintaining the movable platen thereof parallel to the stationary platen.

Another object of this invention is to provide hydraulic controls for use in hydraulic presses which are sensitive and positive in operation for imposing upon the press movable platen opposing forces sufficient to overcome the adverse effects of eccentric press loadings tending to cause the movable platen to tilt out of its parallel relationship with respect to the stationary platen.

Still another object of this invention is to provide hydraulic controls for use in combination with an hydraulic press which are economical to construct, install and maintain.

These objects, as well as the various other novel features and advantages of this invention, will be apparent from the following description and accompanying drawings of which:

Figure 2:
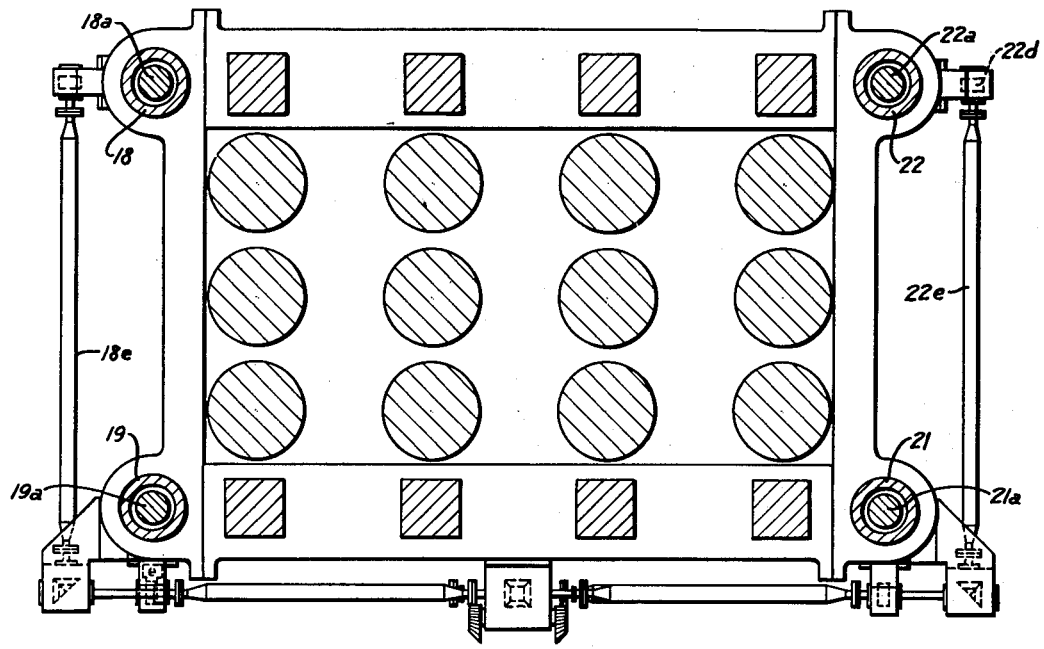
Figure 2 is a partial sectional view taken at II—II of Figure 1.
Figure 1:
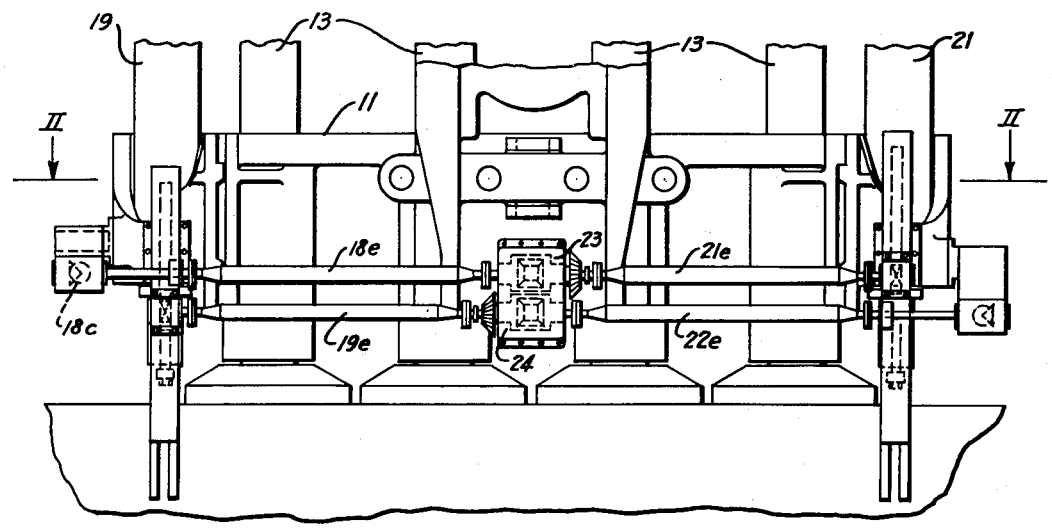
Figure 1 is a partial elevation view of an hydraulic press together with the hydraulic controls therefor embodying the features of the invention herein disclosed.
Figure 3:
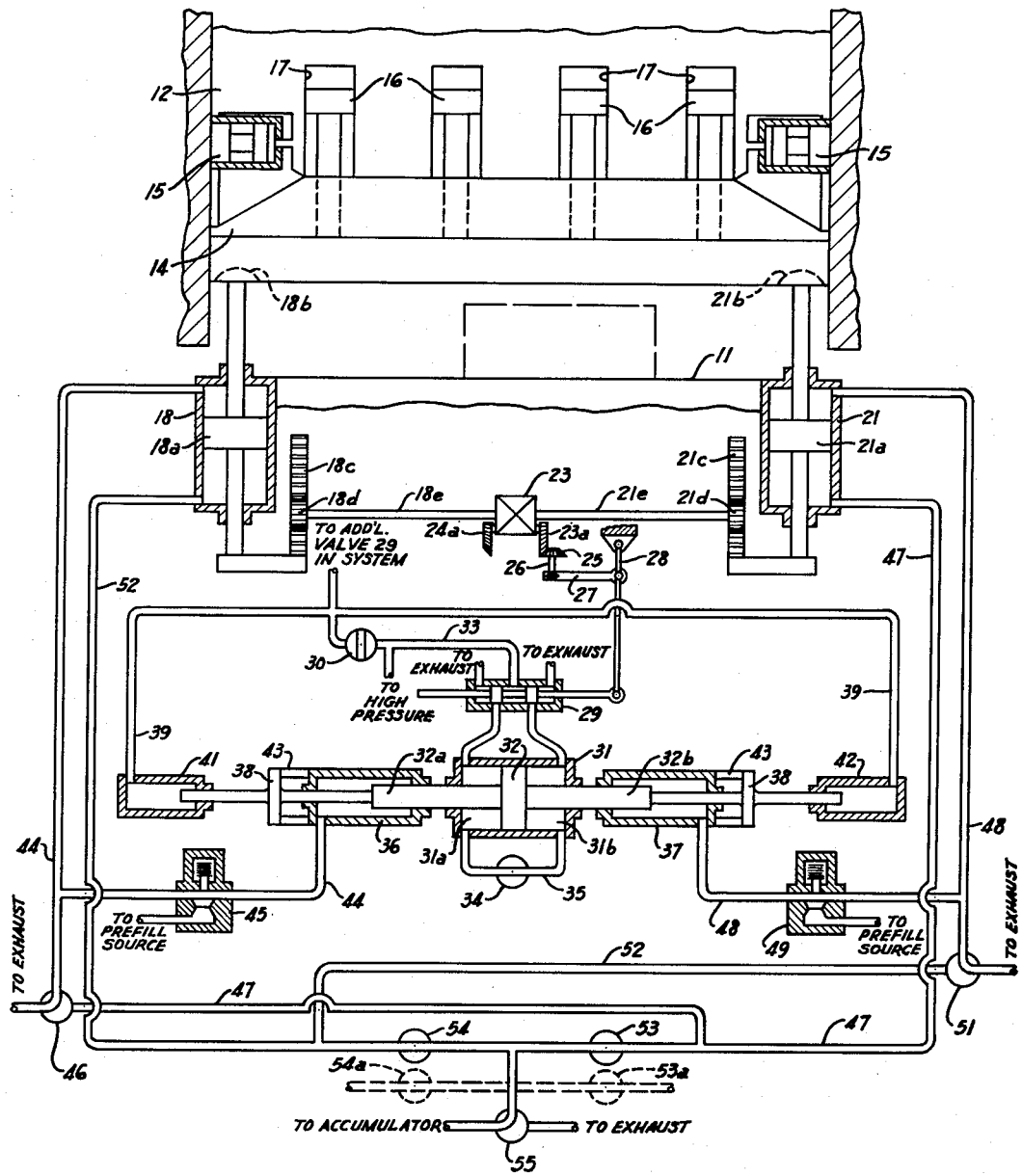
Figure 3 is a schematic drawing of a portion of the hydraulic press and control arrangement illustrated in Figure 1 and in which the movable platen is shown in its suspended position.

With reference to the drawings Figures 2 and 3, the hydraulic press with which the hydraulic controls disclosed herein are associated comprises a bolster or stationary platen 11, a cap or cylinder block 12, a plurality of columns 13 secured therebetween, a movable platen 14, having its working surface parallel to the working surface of the stationary platen, confined in its vertical movement along the columns 13 by guides 15, and single acting pistons 16, for applying the working pressure to the platens, slidably mounted within suitable spaced cylinders 17 provided in the block 12. To the edges of the stationary platen 11 there are affixed cylinders 18, 19, 21 and 22 within which there are confined double acting balancing and platen pull-back pistons 18a, 19a, 21a and 22a respectively. The upper ends of each of the pistons are pivotally secured to suitable lugs 18b, 19b, 21b and 22b respectively provided at the four corners of the movable platen 14. To the lower end of the pistons there are affixed suitable racks 18c, 19c, 21c and 22c which mesh with pinions 18d, 19d, 21d and 22d respectively. The pinions positioned diametrically opposite to each other are connected to the opposite sides of a common planetary or differential gear box. Thus, pinions 18d and 21d are keyed to shafts 18e and 21e which are connected to opposite sides of the planetary gear box 23 and the shafts of pinions 19d and 22d similarly connected to opposite sides of a second planetary gear box 24.

Since diametrically opposite pairs of balancing and pull-back piston cylinder assemblies with the racks and pinions associated therewith function in a fashion similar to each other to actuate the hydraulic controls thereof, but one pair with the controls connected thereto have been illustrated in detail in the drawings and this pair identified by numerals 18 and 21 will now be specifically described.

The gear box 23 is provided with a bevel ring gear 23a in mesh with a bevel gear 25 mounted on a shaft 26, the shaft having secured at its opposite end a bifurcated lever 27 adapted to move to the left or right depending upon the direction in which the gear 25 is displaced. To the lever 27 there is pivotally affixed a lever 28 having its lower or free end secured to a slide valve 29. The two chambers of the slide valve 29 are connected to the opposite sides of a pressure booster or intensifier cylinder 31 having a double acting piston 32 confined therein. Fluid, at high pressure, supplied from a source such as a high pressure pump or the like, which is not shown, is admitted to the slide valve 29 through a valve 30 and a fluid conduit 33 and passes from the valve to one side or the other of the cylinder 31 depending upon the position of valve 29. An equalizer valve 34 is located in a fluid connection 35 extending between the two chambers 31a and 31b of the cylinder 31. The outer ends 32a and 32b of the piston 32 are confined within cylinders 36 and 37 within which the rods of similar centering pistons 38 are confined in axial alignment with the piston 32, being positively actuated for centering the piston 32 in the cylinder 31 by fluid supplied from a high pressure source through conduits 39 to the cylinders 41 and 42 respectively within which the outer rods of the centering pistons are confined. Each centering piston 38 is provided with a stop 43 so that on the completion of each operation by the booster piston 32 and opening of the valve 34, the piston will always be recentered in the cylinder 31.

From the cylinder 36 a fluid conduit 44, having a prefill valve 45 therein, extends to the upper chamber of the balancing and pull-back cylinder 18. By means of a valve 46, the conduit 44 may be connected to the exhaust or by fluid conduit 47 to the lower chamber of the diametrically opposite balancing pull-back cylinder 21. Similarly, the cylinder 37 is connected by a fluid conduit 48 through a prefill valve 49 to the upper chamber of the balancing pull-back cylinder 21 and by valve 51 either to the exhaust or through fluid conduit 52 to the lower chamber of the diametrically opposite balancing and pull-back cylinder 18. Also in the conduits 47 and 52 there are valves 53 and 54 respectively by which the conduits may be connected through a valve 55 either to an accumulator or other pressurized fluid source not shown, or to the exhaust. Shown in dotted lines there are two additional valves 53a and 54a which are the valves for the system of controls which are not illustrated but which are provided for those elements associated with the two diametrically opposite balancing and pull-back piston cylinders 19 and 22. The valve 30 is a common valve for supplying high pressure fluid to the centering pistons for both systems and the valve 55 is a common valve for admitting accumulator fluid to press balancing and pull-back cylinders of both systems.

With reference to Figure 3 showing the movable platen in the suspended position, it will be noted that the two valves 46 and 51 connected to the conduits 44 and 48 and to the upper chambers of the balancing and pull-back cylinders 18 and 21 respectively are open to the exhaust to prefill and that the lower chambers thereof are through conduits 52 and 47, valves 54 and 53 respectively and valve 55 connected to the accumulator.

Figure 4:
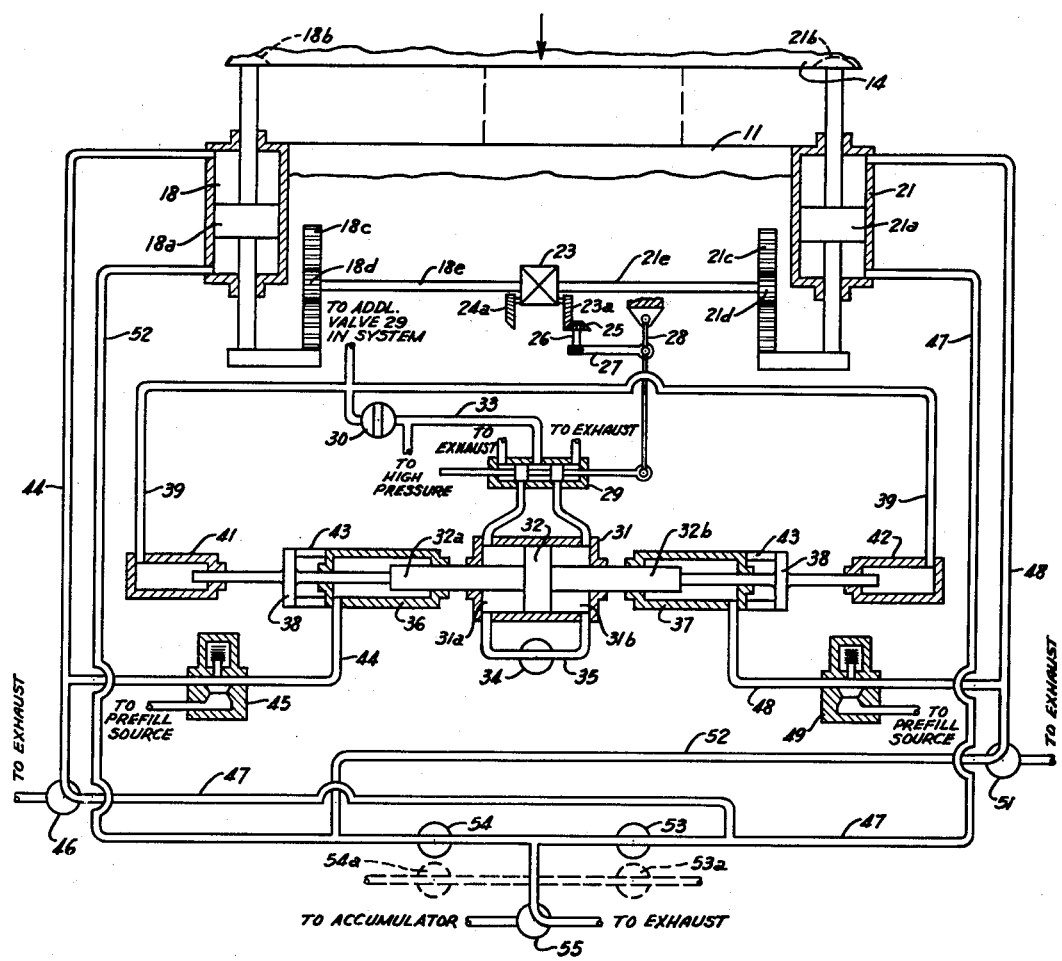
Figure 4 is a view similar to Figure 3 in which the movable platen is shown being supported by the die and workpiece following its free travel downwardly.

In accordance with Figure 4, after a die and workpiece have been placed in the press and the movable platen 14 is to be lowered into engagement with the die and workpiece, the valve 55 is opened to exhaust to prefill to control the flow of fluid away from the lower chambers of the balancing and pull-back cylinders. By the lowering of the balancing and pull-back pistons, fluid is drawn from prefill through the open valves 46 and 51 and into the upper cylinder chambers.

Figure 5:
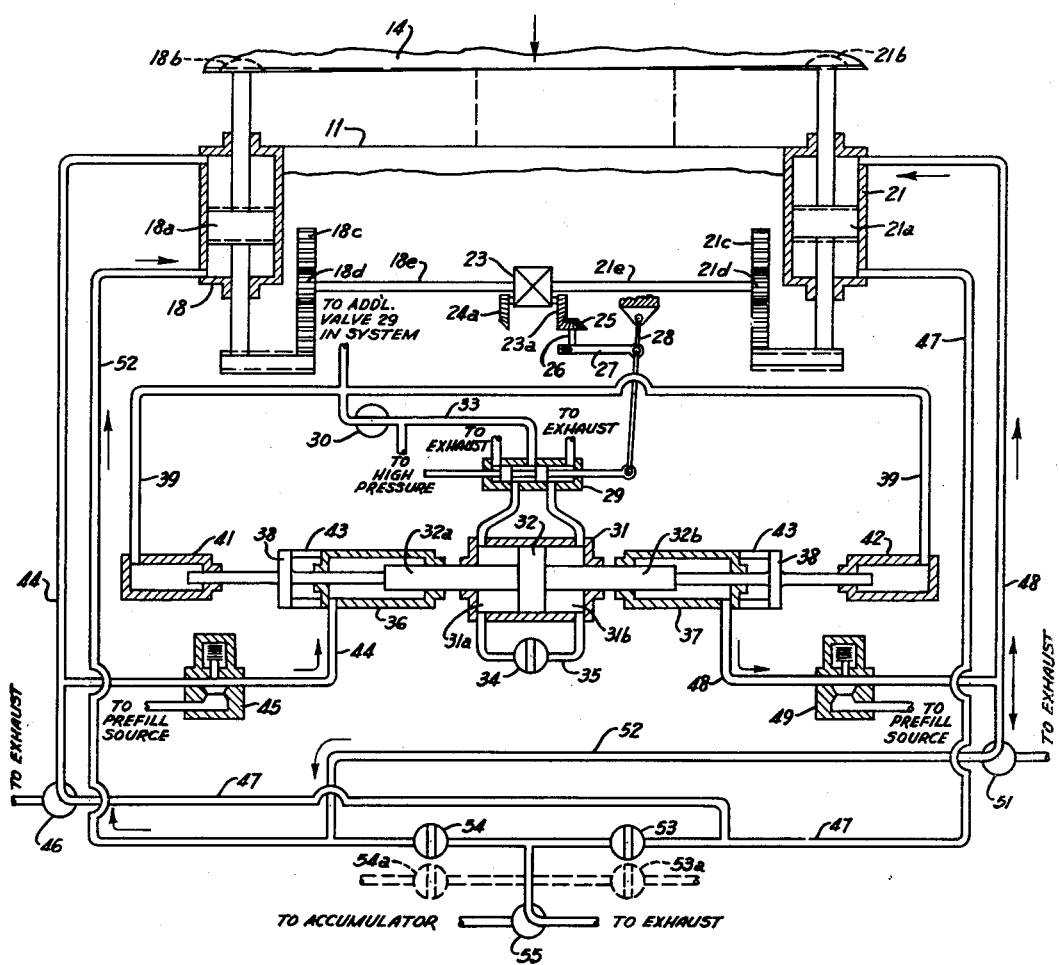
Figure 5 is a view similar to Figure 3 in which the movable platen is shown at one position of its working stroke in which it is engaged with an eccentric workpiece.

For purposes of illustration, it will be assumed that during the working stroke the press is eccentrically loaded and that the eccentric load creates a couple which imposes forces upon the movable platen tending to cause the platen to tilt downwardly toward the left. This creates a condition as shown in Figure 5 in which the balancing and pull-back piston 18a is lower than the piston 21a diametrically oppositely disposed so that the ring gear 23a of the planetary gear box 23 rotates in a direction to cause the slide valve 29 to move to the left thus opening the chamber 31b to the exhaust and the chamber 31a to high pressure fluid entering through the open valve 30. During this portion of the operating cycle of the press, the valve 46 interconnects the conduits 44 and 47 and the valve 51 interconnects the conduits 48 and 52. After the platen has been lowered and makes contact with the workpiece but prior to the application of pressure to the platen to deform the workpiece, the two valves 53 and 54 are closed, either manually or by automatically operable mechanical or electrical means, so that during the pressing cycle of the press, the escape of fluid from the balancing and pull-back piston-cylinders 18 and 27 and the conduits associated therewith is prevented. The two valves 45 and 49 are closed since fluid has previously been admitted therethrough to fill the cylinders and conduits with liquid.

The valves and controls are now so interconnected that fluid flows from the bottom chamber of cylinder 18 to the top of cylinder 21 and from the bottom of cylinder 21 to the top of cylinder 18. To supplement this action, however, and to compensate for loss in volume caused by leakage and compression, additional make up fluid at high pressure is supplied to the balancing and pull back cylinders 18 and 21 so as to overcome the effect of the platen tilting couple and to return the platen to its desired level path of travel. The high pressure fluid admitted to cylinder chamber 31a causes the piston 32 to move to the right exhausting the chamber 31b and increasing the pressure in the cylinder 37. From the high pressure cylinder 37 fluid passes through conduits 48 to the top of cylinder 21 and through conduit 52 to the lower chamber of the balancing and pull-back cylinder 18. As the platen 14 is gradually brought back to its level position the effect is such that the slide valve 29 moves to the right to its closed position inasmuch as the ring gear 23a is rotated in the opposite direction to that effected by tilting of the platen to the left. Since the action just completed would normally cause the piston 32 to come to rest in an off-center position to the right, by opening valve 34 to permit free flow of fluid from chamber 31a to chamber 31b, the centering pistons 38 will push the piston 32 to the left and centrally of the cylinder 31.

Figure 6:
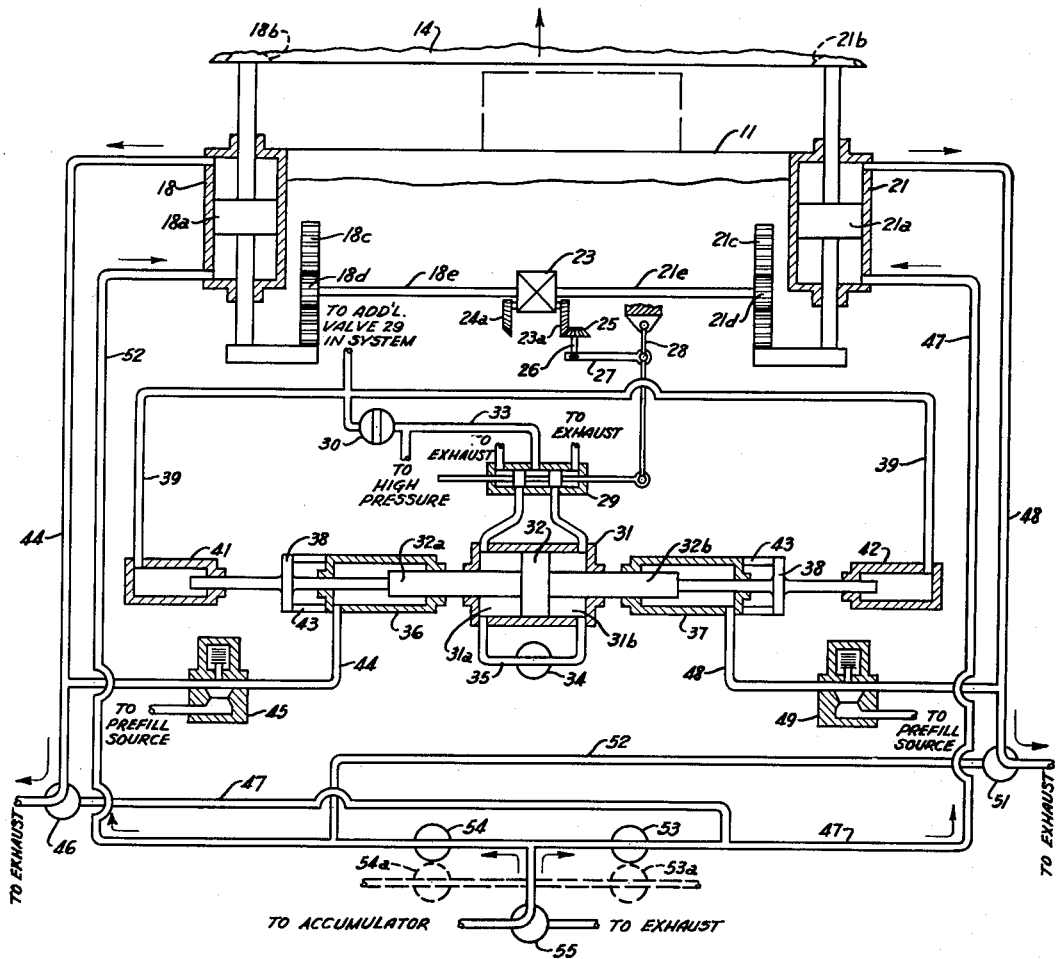
Figure 6 is a view similar to Figure 3 in which the movable platen is being withdrawn from its working to its suspended position.

On completion of the working stroke, the controls then are adjusted as shown in Figure 6 in order to withdraw the movable platen and return it to its suspended position. The valve 30 is closed, valves 46 and 51 opened to exhaust the upper chambers of the balancing and pull-back cylinders, valve 55 opened to the accumulator and valves 53 and 54 opened to permit fluid from the accumulator to enter the lower chambers of the balancing and pull-back cylinders for raising the platen. Inasmuch as the pull-back pistons will impose upon the movable platen substantially equal forces, the guides provided for the platen will be sufficient for maintaining the platen substantially level during the return stroke.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In an hydraulic control circuit for apparatus having a movable platen, and a single acting main piston-cylinder assembly connected to said platen, hydraulically operable double acting equal area balancing and pull-back piston-cylinder assemblies connected to and adjacent each corner of the platen for preventing tilting movement thereof, conduit means interconnecting the upper and lower chambers of diagonally opposite balancing and pull-back piston-cylinder assemblies, intensifier means operably connected to said conduits, and control means connected to said platen and to said intensifier operable on tilting movement of said platen to introduce fluid from said intensifier to said balancing and pull-back piston-cylinders to impose upon said platen a compensating couple in opposition to the tilting movement of the platen.

2. In an hydraulic control circuit for apparatus having a movable platen, and a single acting main piston-cylinder assembly connected to said platen, diagonally opposed hydraulically operable double acting equal area balancing and pull back piston-cylinder assemblies connected to the platen for preventing tilting movement thereof, conduit means interconnecting the upper and lower chambers of diagonally opposed balancing and pull-back piston-cylinder assemblies, intensifier means operably connected to said conduits, and control means connected to said platen and to said intensifier operable on tilting movement of said platen to introduce fluid from said intensifier to said balancing and pull-back piston cylinders to impose upon said platen a compensating couple in opposition to the tilting movement of the platen.

3. In an hydraulic control circuit for apparatus having a movable platen, and a single acting main piston-cylinder assembly connected to said platen, diagonally opposed hydraulically operable double acting equal area balancing and pull-back piston-cylinder assemblies connected to the platen for preventing tilting movement thereof, conduit means interconnecting the upper and lower chambers of diagonally opposite balancing and pull-back piston-cylinder assemblies, and control means comprising a valve, an intensifier connected to said conduit means and to a pressure source through said valve, and means connected to said valve and to said platen operable on tilting movement of said platen to introduce fluid from said intensifier to said balancing and pull-back piston-cylinders to impose upon said platen a compensating couple in opposition to the tilting movement of the platen.

4. In an hydraulic control circuit for apparatus having a movable platen, and a plurality of single acting main piston cylinder assemblies connected to said platen, hydraulically operable double acting equal area balancing and pull-back piston-cylinder assemblies connected to and adjacent each corner of the platen for preventing tilting movement therof, conduit means interconnecting the upper and lower chambers of diagonally opposite balancing and pull-back piston-cylinder assemblies, control means comprising a valve, an intensifier connected to said conduit means and to a pressure source through said valve, a planetary gear system operably connected to the pistons of diagonally opposite balancing and pull-back piston-cylinder assemblies and means operably connecting the cage of said gear system to said valve, so arranged and disposed that tilting movement of said platen causes fluid to be introduced by said intensifier into said balancing and pull-back piston-cylinder to impose upon said platen a compensating couple in opposition to the tilting movement of the platen.

5. In an hydraulic press having a frame, a stationary platen and a movable platen with the working surfaces thereof substantially in parallel planes, and a plurality of single acting main working piston-cylinder assemblies operably connected to said movable platen and to said frame, a plurality of oppositely disposed balancing and pull-back piston-cylinder assemblies having pistons of equal areas connected to said movable and stationary platens, fluid connections between the top of each of said last-mentioned piston-cylinder assemblies and the bottom of the oppositely disposed assembly, control means operably connected to said movable platen, a reversible fluid motor, a valve operably connected to said control means and to said fluid motor for admitting high pressure fluid to and for selectively actuating said fluid motor, pressure boosters operably connected to said motor, fluid connections for admitting fluid to each of said boosters, and fluid connections between said boosters and the top and the bottom of oppositely disposed balancing and pull back piston cylinder assemblies whereby on eccentric work loads being applied between the two platens thereby to impose a couple thereon to cause misalignment thereof, pressurized fluid is introduced by said booster means to the bottom of the balancing piston-cylinder assembly influenced by that portion of the platen most adjacent to the stationary platen and to the top of the balancing piston-cylinder assembly influenced by that portion of the movable platen most remote from the stationary platen thereby to impose upon the movable platen a compensating couple to effect realignment of the two platens.

6. In an hydraulic press having a frame, a stationary platen and a movable platen with the working surfaces thereof substantially in parallel planes, said control circuit comprising a plurality of single acting main piston-cylinder assemblies operably connected to said movable platen and to said frame, a plurality of oppositely disposed double acting balancing and pull-back piston-cylinder assemblies having pistons of equal areas connected to said movable and stationary platens, fluid connections between the upper chamber of each of said last-mentioned piston-cylinder assemblies and the lower chamber of the diametrically oppositely disposed assembly, a rack and pinion operably connected to said movable platen and to each of said balancing and pull-back piston-cylinder assemblies, a plurality of planetary gear assemblies each having a pair of diametrically oppositely disposed rack and pinions operably connected thereto, a plurality of reversible fluid motors, a valve operably connected to each of said planetary gear assemblies and to said fluid motors for admitting high pressure fluid to and for selectively actuating said fluid motors, an intensifier operably connected to each of said motors, connections for admitting fluid to each of said intensifiers, and fluid connections between said intensifiers and the tops and the bottoms of oppositely disposed balancing and pull-back piston-cylinder assemblies whereby on eccentric work loads being applied between the platens imposing a couple thereon to cause misalignment thereof, pressurized fluid is introduced by said intensifier means to the bottom of the balancing piston-cylinder assembly adjacent to the lower portion of the movable platen and to the top of the balancing piston-cylinder assembly adjacent to the higher portion of the movable platen thereby to impose upon the movable platen a compensating couple to effect realignment of the two platens.

7. In an hydraulic control circuit for apparatus having a movable platen, and a plurality of single acting main piston-cylinder assemblies connected to said platen, hydraulically operable double-acting equal area balancing and pull-back piston-cylinder assemblies connected to and adjacent each corner of the platen for preventing tilting movement thereof, conduit means interconnecting the upper and lower chambers of diagonally opposite balancing and pull-back piston-cylinder assemblies, fluid pressure means operably connected to said conduits, and control means connected to said platen and to said fluid pressure means operable on tilting movement of said platen to introduce fluid from said fluid pressure means to said balancing and pull-back piston-cylinders to impose upon said platen a compensating couple in opposition to the tilting movement of the platen.

8. In an hydraulic control circuit for apparatus having a movable platen, and a plurality of main piston-cylinder assemblies connected to said platen, fluid operable double-acting balancing and pull-back piston-cylinder assemblies connected to and adjacent each corner of the platen, conduit means interconnecting the upper and lower chambers of diagonally opposite balancing and pull-back piston-cylinder assemblies, fluid pressure means operably connected to said conduits, and control means connected to said platen and to said fluid pressure means operable on tilting movement of said platen to introduce fluid from said fluid pressure means to said conduits in such a direction to maintain level the press movable platen.

9. In an hydraulic control circuit for apparatus having a movable platen, and a plurality of main piston-cylinder assemblies connected to said platen, a pair of fluid operable piston-cylinder assemblies connected to said platen at diametrically opposite points with respect to one another, conduit means interconnecting the upper and lower chambers of one piston-cylinder assembly with the lower and upper chambers respectively of the other, fluid pressure means operably connected to said conduits, and control means connected to said platen and to said fluid pressure means operable on tilting movement of said platen to introduce fluid from said fluid pressure means to said diametrically opposite piston-cylinder assemblies in a direction to maintain the platen level.

10. In an hydraulic control circuit for apparatus having a movable platen, and a plurality of main piston-cylinder assemblies connected to said platen, diagonally opposed fluid operable double-acting piston-cylinder assemblies connected to the platen for imposing thereon a righting couple to prevent tilting movement thereof, conduit means interconnecting the upper and lower chambers of a piston-cylinder assembly with the lower and upper chambers respectively of a diametrically opposed piston-cylinder assembly, fluid pressure intensifier means operably connected to said conduits, and control means connected to and operable by tilting movement of said platen to introduce fluid from said intensifier through said conduits in such a direction to maintain level the movement of the platen.

11. In a device having a movable workpiece engaging member, a pair of spaced double-acting piston-cylinder assemblies connected to said member, conduit means interconnecting the upper and lower chambers of one assembly with the lower and upper chambers respectively of the other assembly, fluid pressure means operably connected to said conduits and means including reversely operable control means connected to said member and to said fluid pressure means operable on tilting movement of said member to introduce fluid from said fluid pressure means to said spaced piston-cylinder assemblies through said conduits in a direction to oppose the tilting movement of said member.

References Cited in the file of this patent

UNITED STATES PATENTS

| | | |
|---|---|---|
| 2,224,968 | Klocke | Dec. 17, 1940 |
| 2,283,447 | MacMillin et al. | May 19, 1942 |
| 2,286,798 | Flowers | June 16, 1942 |
| 2,302,132 | MacMillin et al. | Nov. 17, 1942 |
| 2,400,685 | Collins | May 21, 1946 |